United States Patent [19]

Klingensmith

[11] 4,244,093
[45] Jan. 13, 1981

[54] TUBING SLIP PULLING TOOL

[76] Inventor: Fred Klingensmith, 107 E. Hobson, Sapulpa, Okla. 74066

[21] Appl. No.: 21,438

[22] Filed: Mar. 19, 1979

[51] Int. Cl.³ .............................................. B23P 19/04
[52] U.S. Cl. ....................................... 29/256; 29/283
[58] Field of Search ................. 29/256, 271, 272, 283; 81/57.16, 57.34

[56] References Cited

U.S. PATENT DOCUMENTS 3,078,556  2/1963  Carroll .................................... 29/283

OTHER PUBLICATIONS

National Bureau of Standards, Tech. Note No. 253, Nov. 30, 1964, Charles B. Haegele, Gear Puller.

Primary Examiner—James L. Jones, Jr.
Attorney, Agent, or Firm—William S. Dorman

[57] ABSTRACT

A tubing slip pulling tool for the removal of tubing slips from a well casing head comprising a substantially disc-like member; a centrally spaced circular opening to receive a tubing therethrough; and a plurality of radial slots circumferentially spaced around the disc-like member, these slots being adapted to receive bolts therethrough for attaching the tool to the tubing slips. In an alternate embodiment of the present invention, the disc-like member is divided into three equal-sized arcuate sections, these sections being provided with hinge means to permit the opening of the tool and tongue and sheath for securing the tool in a coplanar alignment.

7 Claims, 3 Drawing Figures

TUBING SLIP PULLING TOOL

BACKGROUND OF THE INVENTION

1. Field of the Invention

The present invention relates to a tubing slip pulling tool and, more particularly, to such a tool which is of a disc-like design to be placed around a tubing thereby acting as a shield to protect the worker's hands and arms and is attached to the slips by means of bolts.

2. Description of the Prior Art

There is an ever increasing challenge to obtain more oil and gas from existing wells. After a well has completed its primary recovery term, some form of reworking is required to obtain the remaining oil and/or gas from the well. Usually in reworking these wells, such as during a "Frac job", the inner tubing is to be removed, however, the tubing is secured by means of tubing slips which are located within the casing head. These slips are usually removed by tightening a metal band or string around the top portion of the slips thereby releasing the slips. The slips are then lifted from the casing head and the metal band is removed. Occasionally, a slip will come loose from he metal band and drop into the casing, this then involves a long and difficult retrieval operation. This method of removal is also dangerous in that the well worker's hands and arms are exposed to the pressurized portions of the well head and to the compressed slips.

In the past, numerous tubing slip pulling tools have been proposed. However, none of these prior art tools have been of a disc-like design to be placed around a tubing thereby acting as a shield to protect the worker's hands and arms from the pressurized portions of the well head and to be attached to the slips by means of bolts.

SUMMARY OF THE INVENTION

The present invention generally provides a tubing slip pulling tool that is placed around a tubing and is attached to the tubing slips by means of bolts, thereby decreasing the probability of a slip dropping into the casing. The tool further acts as a shield to protect the well worker's hands and arms from the pressurized portions of the well head.

The present invention, more particularly, comprises a substantially disc-like member having a centrally spaced circular opening to receive a tubing therethrough and a plurality of radial slots circumferentially spaced around the disc-like member, these slots being adapted to receive bolts therethrough for attaching the tool to the tubing slips. In an alternate embodiment of the present invention, the disc-like member is divided into three equal sized arcuate sections, these sections being provided with hinge means to permit the opening of the tool and tongue and sheath means for securing the tool in a coplanar alignment.

BRIEF DESCRIPTION OF THE DRAWINGS

FIG. 3 is a vertical sectional view of a casing head, with a plurality of tubing slips in a position around a drill pipe, and showing the tool attached to said slips.

DETAILED DESCRIPTION OF THE PREFERRED EMBODIMENTS

Figure 1:
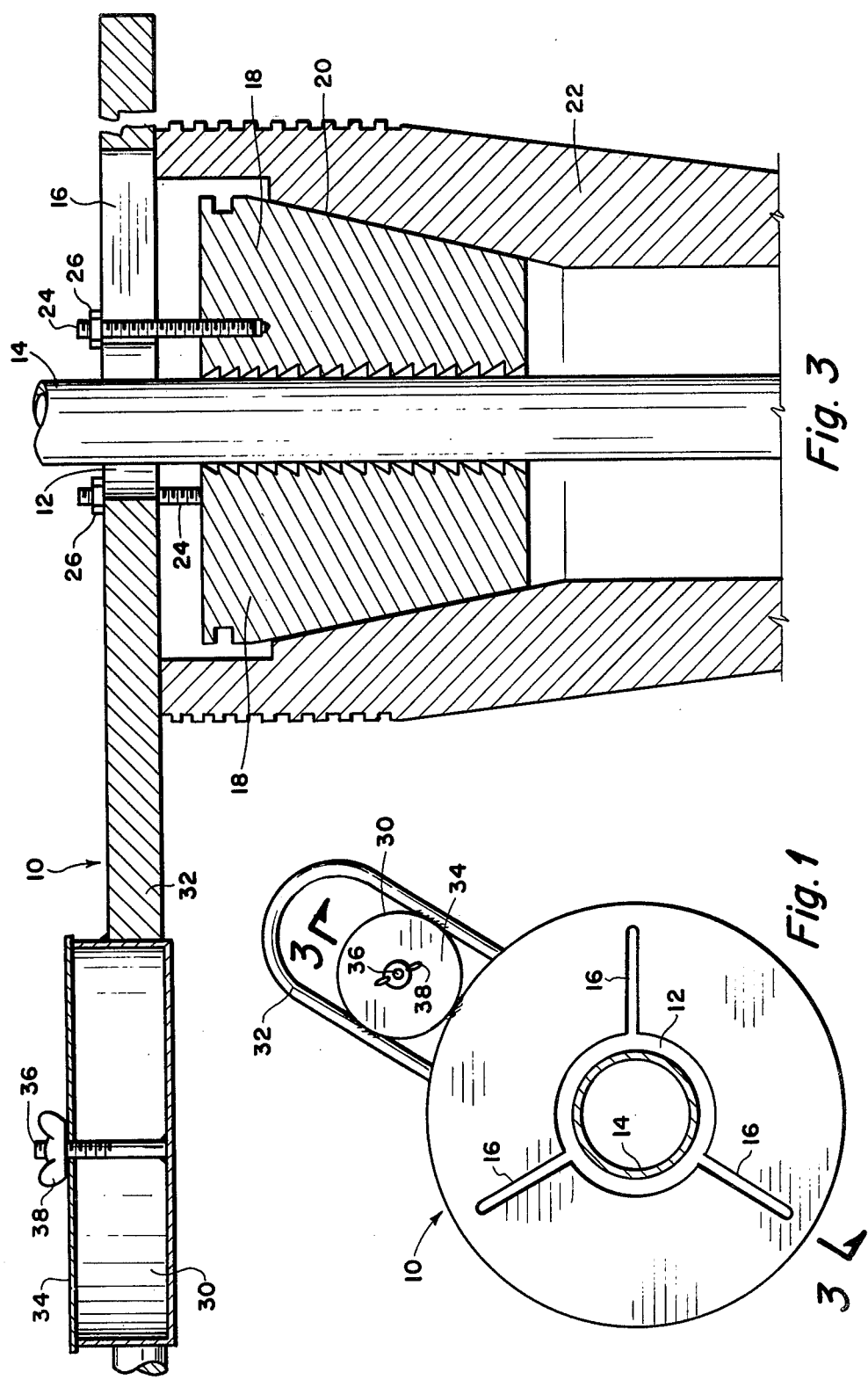
FIG. 1 is a plan view of a tubing slip pulling tool embodying the present invention.

Referring to the drawings in detail, reference character 10 generally indicates a tubing slip pulling device or tool particularly designed for the removal of tubing slips from a well casing head. As shown in FIG. 1, the tool 10 is substantially disc-like in shape with a centrally spaced circular opening 12 whereby a tubing 14 may pass therethrough. A plurality of radial slots 16 are circumferentially spaced around the disc-like member at approximately 120° intervals, each of these slots 16 opens into the circular opening 12. The function of the slots 16 will be described herein below.

As shown in FIG. 3, a plurality of tapered tubing slips 18, in contact with the tubing 14, fit against a tapered surface 20 which is located within and constitutes a part of a well casing head 22. The weight of the tubing 14 forces the slips 18 downward thereby securing the tubing 14. When the tubing 14 was to be removed by the prior art method, a metal band or string (not shown) would be positioned around the top portions of the slips 18 thereby compressing the slips 18. The slips 18 would then be lifted vertically from the casing head 22. This method of removal was potentially dangerous in that occasionally, when the compressed slips 18 were removed from the casing head 22, a slip 18 could be rejected from within the metal band (not shown) and strike a well worker's hands or arms.

The tool 10 provides a novel means for removal of the slips 18 which eliminates the need for the metal band (not shown) described above. Also, when the slips 18 are removed, the tool 10 acts as a shield to protect the well worker from fluid or solid matter that might be ejected by fluid pressure within the casing head 22. The tool 10 is lowered in position around a tubing 14 onto the top of the casing head 22 and is then secured to the slips 18 by means of a plurality of threaded bolts 24, with nuts 26 threaded thereto, which extend through the elongated slots 16 and are received into a plurality of threaded holes 28 (only one of which is shown in FIG. 3) which are spaced within the top edge of the slips 18. Note that the upper ends of the slips 18 are spaced below the upper edge of the casing head 22. It should be understood that the tool 10 may be used to remove various sized slips 18 which are within a range of diameters that correspond to the length of the elongated slots 16. The slips 18 are removed from the casing head 22 by tightening the nuts 24 which causes an upward pulling force to be exerted against the slips. When the slips have been loosened, they can be removed as a group by lifting up on the tool thereby removing both the tool 10 and the slips from around the tubing 14. Of course, if it is desired, the slips may be removed individually by first removing the nuts, then the tool 10, etc.

The bolts 24 and nuts 26, which are used to attach the tool 10 to the slips 18, may be stored in a cylindrical compartment 30 which is attached to the circular outer edge of the tool 10 and is received within a "U"-shaped handle 32 which extends radially from the circular outer edge of the tool 10. The compartment 30 is provided with a cover 34 which is secured by means of a centrally spaced bolt 36 and a wing nut 38 which is attached to the cover 34.

The tool 10 is to be used on slip removal operations where the tubing 14 does not extend more than a short distance above the casing head 22. If however, the tubing 14 does not extend a greater distance above the casing head and the slips 18 need to be removed, then a tool 40, which is an alternate embodiment of the present invention, should be used.

Figure 2:
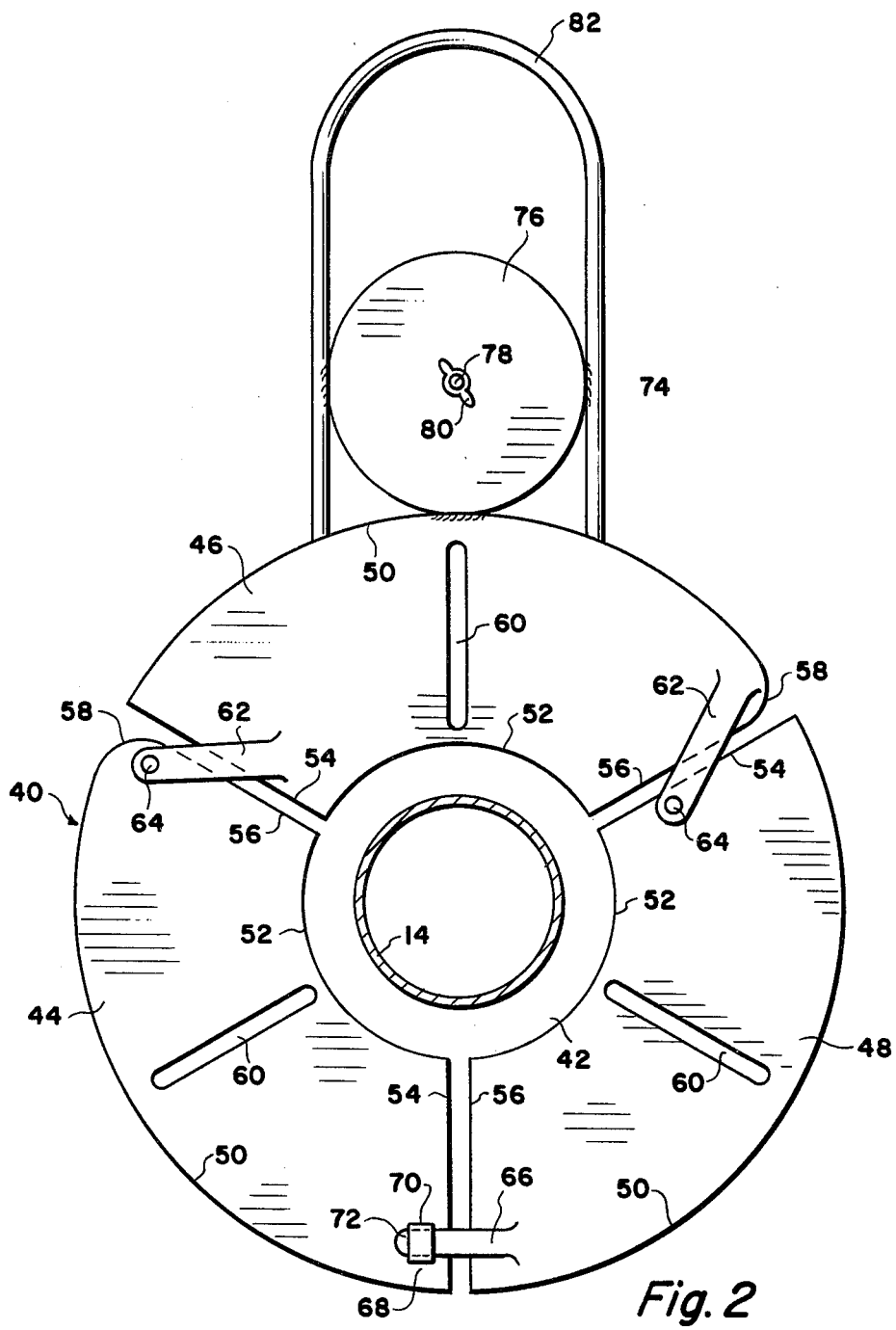
FIG. 2 is a plan view of an alternate embodiment of the tool.

As shown in FIG. 2, the tool 40 is similar to the tool 10 in that it is substantially disc-like in shape with a centrally spaced circular opening 42 whereby a tubing 14 may pass therethrough. The tool 40 is divided into a plurality of substantially equivalent arcuate sections 44, 46 and 48, each of which is defined by circular outer edge 50, a circular inner edge 52, and a pair of spaced radial side edges 54 and 56. Sections 44 and 46 are provided with outer rounded corners 58 on the outer ends of their radial side edges 56 adjacent the unrounded radial side edges 54 of the adjacent sections 46 and 48, respectively.

Each of the sections 44, 46 and 48 is provided with a centrally spaced radial slot 60, these slots 60 are circumferentially spaced at approximately 120° intervals within the tool 40. The function of the slots 60 is substantially the same as the slots 16 within the tool 10 described above.

The tool 40 is provided with hinge means which will permit the opening of the tool 40. The hinge means consist of a hinge bar 62 which extends non-radially from section 46 to section 44 and is pivotly connected thereto by a pin 64 and a second hinge bar 62 which extends non-radially from section 46 to section 48 and is pivotly connected thereto by a pin 64. The tool 40 is opened by outwardly rotating sections 44 and 48, the opening thereof being facilitated by the rounded tips 58. The tool 40 is provided with means to maintain the tool 40 in coplanar alignment during the slip removal operation. This means consists of an elongated tongue 66 which extends from section 48 and is received into a sheath 68 which is spaced on section 44. The sheath 68 is formed by a short vertical member 70 and a horizontal member 72.

The tool 40 is further provided with a cylindrical compartment 74, which is provided with a cover 76, and whose function is the same as for the compartment 30 attached to the tool 10 described above. The compartment 78 is attached to the circular outer edge 50 of section 46 and is received within a "U"-shaped handle 82 which radially extends from the circular outer edge 50 of section 46. The cover 76 is secured over the compartment 74 by means of a centrally spaced bolt 78 and a wing nut 80 which is attached to the cover 76.

After the tool 40 is positioned and closed and around a tubing 14, the operation of the tool 40 is substantially the same as the tool 10 described herein above.

Whereas, the present invention has been described in particular relation to the drawings attached hereto, it should be understood that other and further modifications of the invention, apart from those shown or suggested herein, may be made without the scope and spirit of this invention.

What is claimed is:

1. A tubing slip pulling tool comprising a substantially disc-like member; said tool having a centrally spaced circular opening therein to receive a tubing therethrough, said tubing having a plurality of slips engagingly surrounding the same below said tool; and said tool also having a plurality of radial slots circumferentially spaced around the disc-like member, said slots being adapted to receive bolts therethrough for attaching said tool to the tubing slips; said disc-like member being divided into a plurality of equal sized accurate sections, said sections being provided with hinge means to permit the opening of the tool.

2. A tubing slip pulling tool as set forth in claim 1 wherein said disc-like member is provided with a tongue and sheath means for securing the tool in a coplanar alignment.

3. A tubing slip pulling tool as set forth in claim 1 wherein said disc-like member is divided into three arcuate sections, each section being defined by a circular outer edge, a circular inner edge, and a pair of spaced radial side edges, two of said sections being provided each with an outer rounded corner on the outer end of one radial side edge only adjacent an unrounded radial side edge of an adjacent section to facilitate the opening of the tool, each of said sections being provided with one of said radial slots.

4. A tubing slip pulling tool as set forth in claim 3 wherein a "U"-shaped handle radially extends from the circular outer edge of one of said sections.

5. A tubing slip pulling tool as set forth in claim 4 wherein said "U"-shaped handle is provided with a cylindrical compartment which is received therein.

6. A tubing slip pulling tool as set forth in claim 1 wherein said disc-like member is provided with a "U"-shaped handle that radially extends therefrom.

7. A tubing slip pulling tool as set forth in claim 6 wherein said "U"-shaped handle is provided with a cylindrical compartment which is received therein.

* * * * *